A. W. TUTTLE & R. C. CHILDS, Jr.
STAMP CANCELING MACHINE.
APPLICATION FILED MAR. 10, 1916.
1,258,831.
Patented Mar. 12, 1918.
5 SHEETS—SHEET 4.
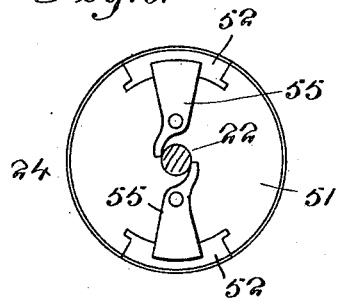
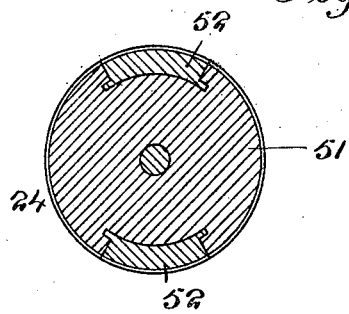
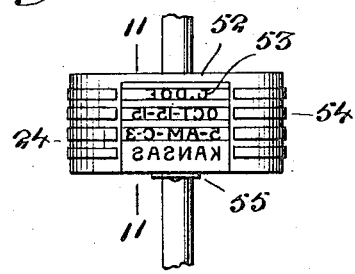
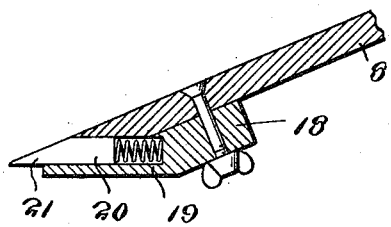
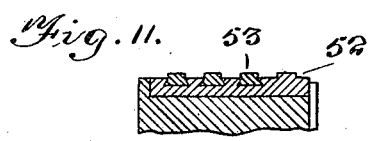
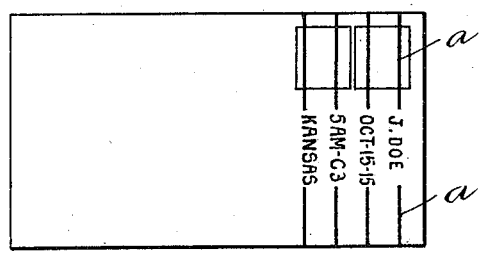
Inventors
Albert W. Tuttle
Robert C. Childs, Jr.
Witnesses
By Victor J. Evans
Attorney A. W. TUTTLE & R. C. CHILDS, Jr.
STAMP CANCELING MACHINE.
APPLICATION FILED MAR. 10, 1916.

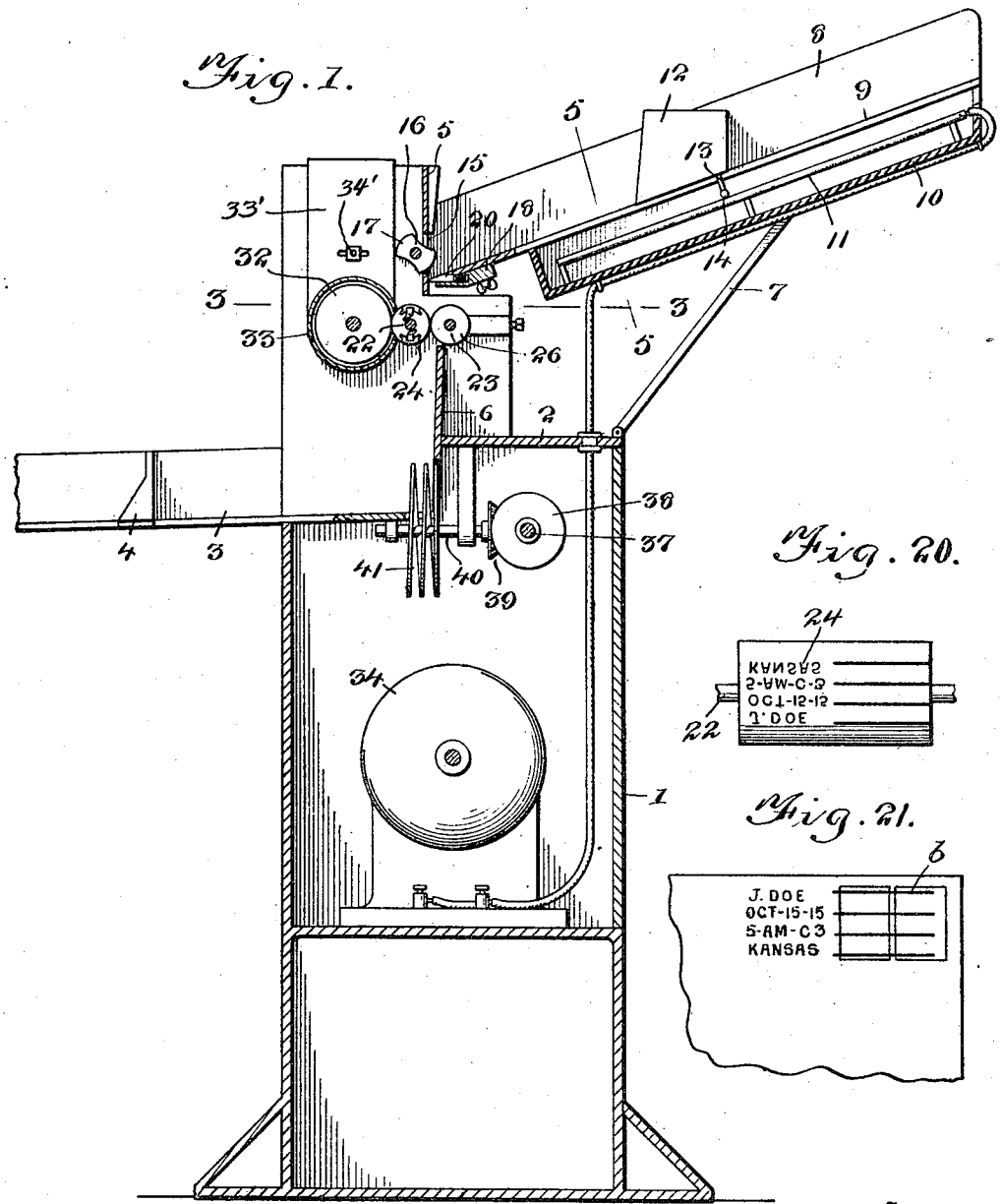

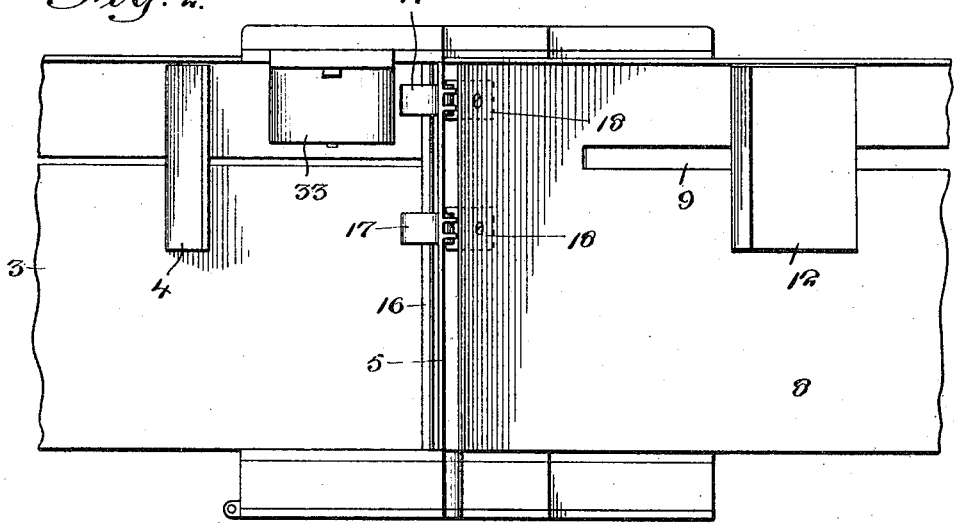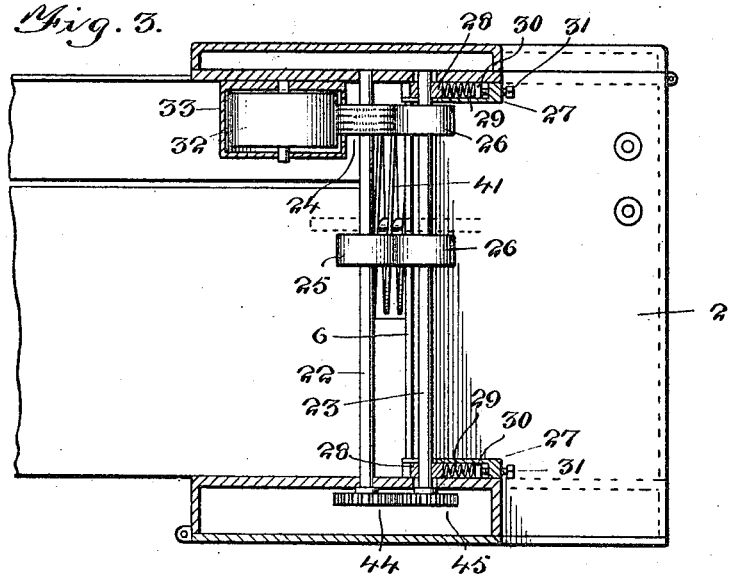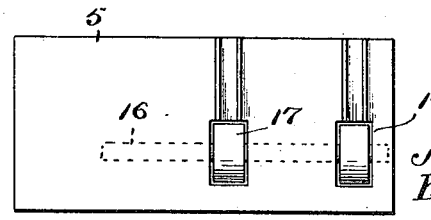

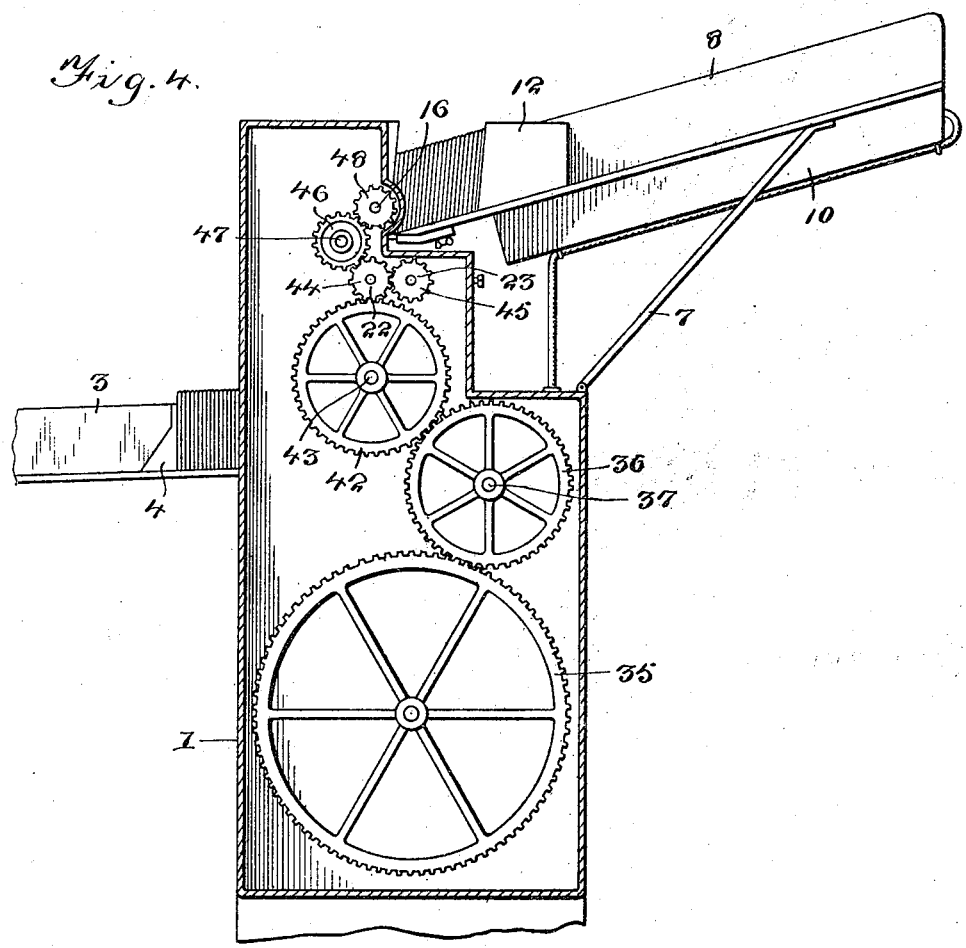

1,258,831.

Patented Mar. 12, 1918.

Inventors
Albert W. Tuttle
Robert C. Childs, Jr.
By Victor J. Evans
Attorney

Witnesses

UNITED STATES PATENT OFFICE.

ALBERT W. TUTTLE AND ROBERT C. CHILDS, JR., OF HUTCHINSON, KANSAS.

STAMP-CANCELING MACHINE.

1,258,831.  Specification of Letters Patent.  Patented Mar. 12, 1918.

Application filed March 10, 1916. Serial No. 83,387.

*To all whom it may concern:*

Be it known that we, ALBERT W. TUTTLE and ROBERT C. CHILDS, Jr., citizens of the United States, residing at Hutchinson, in the county of Reno and State of Kansas, have invented new and useful Improvements in Stamp-Canceling Machines, of which the following is a specification.

This invention relates to improvements in machines for canceling the stamps on envelops and has particular application to an automatically controlled power driven stamp canceling machine.

In carrying out our invention, we employ a chute designed to hold the envelops in a row with their longitudinal dimensions arranged across the chute in combination with a canceling stamp adapted to cancel the stamps on the envelops, while the latter are in horizontal position, and means arranged at the discharge end of the chute and operable to deliver the envelops singly to the canceling stamp so that the stamps on the envelops will be canceled.

It is also our purpose to provide a stamp canceling machine wherein the canceling stamp and the delivery means will be motor driven, and the motor automatically cut out of service succeeding the canceling of the stamps on the envelops, thereby preventing waste of energy after all of the stamped envelops have been canceled.

Another object of our invention is to provide a machine of the class described which will embody means operable automatically to arrange the envelops in orderly fashion after the stamps thereon have been canceled, thereby enabling the canceled envelops to be removed from the machine quickly and easily.

With the above and other objects in view, the invention consists in the construction, combination and arrangement of parts hereinafter set forth in and falling within the scope of the claims.

In the accompanying drawings;

Figure 1 is a vertical sectional view through a machine constructed in accordance with the present invention.

Fig. 2 is a fragmentary top plan view thereof.

Fig. 3 is a sectional view on the line 3—3 of Fig. 1.

Fig. 4 is a sectional view taken on a plane parallel with Fig. 1, illustrating the gearing for operating the mechanism.

Fig. 5 is a sectional view on the line 5—5 of Fig. 1.

Fig. 6 is a fragmentary longitudinal sectional view through the chute showing the circuit breaker for the motor.

Fig. 7 is a face view of the means for delivering the envelops to the canceling stamp.

Fig. 8 is a view in end elevation of the canceling stamp.

Fig. 9 is a transverse sectional view therethrough.

Fig. 10 is a top plan view of the same.

Fig. 11 is an enlarged fragmentary longitudinal sectional view through the canceling stamp.

Fig. 12 is a fragmentary longitudinal sectional view through the device for holding the envelops on the chute.

Fig. 13 is a plan view of the envelop showing the stamp thereon canceled.

Fig. 20 is a view in elevation showing a modified form of stamping roller.

Fig. 21 is a view showing the envelop marked with the roller shown in Fig. 20.

Figure 14:
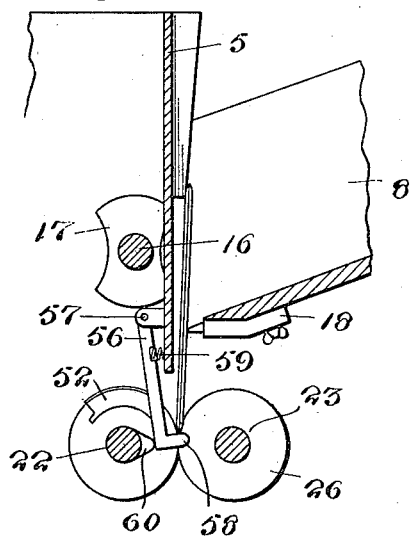
Fig. 14 is a fragmentary vertical sectional view showing a modified form of the invention.
Figure 15:
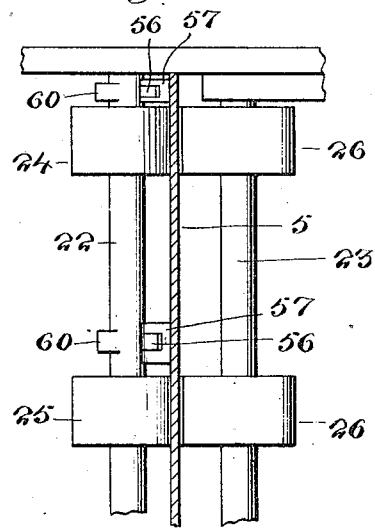
Fig. 15 is a horizontal sectional view through the same.

Referring now to the drawings in detail, 1 designates a vertical casing. Arranged across the casing 1 at the upper end thereof is a board 2 having one edge secured to one wall of the casing, the ends fastened to the walls at right angles to the first wall, and the other edge terminating short of the wall opposite from the first-mentioned wall. The last-mentioned wall of the casing 1 is of less height than the first-named wall and resting upon the upper end of the last-named wall and disposed below the board 2 is one end of a chute 3 and arranged within the chute 3 and capable of sliding movement therein is a block 4. The upper ends of the walls at right angles to the wall supporting the chute 3 project upwardly above the board 2 and arranged across these upwardly projecting portions and secured thereto at the upper ends thereof is a vertical plate 5, while arranged below the vertical plate 5 and offset therefrom is a similar plate 6 and having the lower portion thereof spanning the space between the board 2 and the bottom of the chute 3, and the upper edge spaced apart from the lower edge of the plate 5. Secured to the board 2 adjacent to the outer edge thereof and projecting upwardly and outwardly therefrom are supporting arms 7 suitably spaced apart and mounted upon the upper ends of the supporting arms 7 and fastened thereto is a chute 8 inclined downwardly from the outer end thereof toward the plate 5 and having the lower end thereof secured to the plate 5. Formed in the bottom wall of the chute 8 is a longitudinal slot 9 and secured to the bottom of the chute is a casing 10 preferably, although not necessarily, formed of insulating material. Arranged within the casing 10 are longitudinal contact bars 11 spaced apart in parallelism, while slidably mounted upon the bottom wall of the chute 8 is a follower block 12 having the lower end thereof equipped with a depending pin 13 carrying a horizontal bridging strip 14 adapted to bear upon the contact bars 11 to electrically connect such bars. The block 12 is of a suitable length and the envelops carrying the stamps to be canceled are placed in the chute 8 in a row with their longitudinal dimensions arranged across the chute and the front envelop bears against the plate 5, while the back envelop bears against the follower 12 and the follower acts to hold the envelops closely packed and in proper order for removal from the chute.

Formed in the plate 5 are openings 15 spaced apart a distance less than the length of the envelops and journaled in the upwardly projecting portions of the particular walls of the casing immediately behind the openings 15 is a shaft 16 and fixed upon the shaft 16 are blocks 17 adapted to rotate with the shaft and having the ends thereof rounded. These blocks work within the respective openings 15 and in the rotation of the shaft the rounded ends of the blocks engage the envelops successively so as to slide the envelops downwardly along the plate 5 out of the chute. Fastened to the bottom wall 9 of the chute at the lower end thereof is a block 18 having the side edge thereof contiguous to the end of the bottom wall of the chute formed with bores 19 spaced apart a distance corresponding to the space between the openings 15 and slidably mounted in the bores 19 are spring operated plungers 20 respectively having the outer ends thereof beveled off as at 21 to form continuations of the upper surface of the bottom wall of the chute. The outer ends of these plungers bear against the plate 5 so as to hold the envelops upon the chute and as the blocks 17 are rotated to deliver the envelops from the chute the plungers 20 are forced inwardly against the action of their springs so as to release each envelop as the latter is moved downwardly under the action of the rounded ends of the blocks on the shaft 16. These plungers and blocks coöperate with one another and form the delivery means for delivering the envelops from the chute and in this connection we wish it to be understood that this structure of the delivery means may be changed and equivalent elements substituted for those illustrated without departing from the spirit of our invention.

Journaled in the upwardly projecting portions of the frame 1 below the shaft 16 are horizontal shafts 22 and 23 arranged side by side and disposed upon opposite sides of the plate 5 below such plate and above the plate 6. Fastened upon the shaft 22 is a circular canceling stamp 24 and a roller 25 spaced apart from the canceling stamp, while fixed upon the shaft 23 are rollers 26 spaced apart and having the peripheries thereof in engagement with the peripheries of the canceling stamp and the roller 25 respectively. The ends of the shaft 23 are mounted in slots formed in the upwardly projecting portions of the casing and secured to the inner surfaces of such portions of the casing are guides 27 in which are mounted blocks 28 respectively and the end portions of the shaft 23 are mounted in these blocks. Arranged within each guide 27 is a coiled expansion spring 29 having one end bearing upon the particular block 28 and the other end in engagement with a take-up block 30 connected with an adjusting screw 31 threaded through the end of the guide remote from the block 28. These springs 29 bear upon the blocks 28 to force the shaft 23 toward the shaft 22 so that the rollers 26 will frictionally engage the peripheries of the canceling stamp and the roller 25, while the tension of the springs may be varied by means of the adjusting screws 31 and the take-up blocks 30.

Arranged behind the canceling stamp 24 and frictionally engaging such stamp so as to rotate therewith is an inking roller 32 rotatably mounted in the reservoir 33 mounted upon a plate 33′ secured to one of the upwardly projecting portions of the casing by means of a bolt 34′ passed through a slot in the plate 33′ and an opening in the upwardly projecting portion of the casing. The reservoir 33′ prevents splashing of the ink and is formed with a slot contiguous to the canceling stamp so that the latter may frictionally engage the inking roller.

Journaled in the casing 1 is a transverse shaft 37 arranged below the board 2 and keyed upon the shaft 37 is a bevel gear 38 meshing with a similar gear 39 fast upon one end of a horizontal shaft 40 arranged at right angles to the shaft 37 and journaled in suitable bearings. Fixed upon the shaft 40 is a spiral carrier 41 working in an opening formed at the juncture of the plate 6 with the bottom wall of the chute 3 and disposed in line with the space between the canceling stamp 24 and the roller 25.

Arranged within the casing 1 is an electric motor 34 and fixed upon the armature shaft of said motor is a spur gear 35 meshing with a relatively small similar gear 36 fixed upon the shaft 37. The spur gear 36 meshes with an idler gear 42 rotatably mounted upon a stub shaft 43. Meshing with the idler gear 42 is a pinion 44 fast upon the adjacent end of the shaft 22 and this pinion 44 meshes with a pinion 45 fixed upon the shaft 23 so that the shafts 22 and 23 will rotate simultaneously in opposite directions. The pinion 44 also meshes with a pinion 46 loosely mounted upon a stub shaft 47, while fixed upon the shaft 16 is a pinion 48 meshing with the pinion 46.

In the use of the machine, the envelops are placed in the chute 8 as previously described and the follower 12 forces the envelops down toward the lower end of the chute. The motor 34, when in operation, rotates the gear wheel 35, thereby transmitting motion through the gear wheel 36 to the shaft 37 and through the gear wheel 42 to the pinions 44 and 45 and to the pinion 48. In the operation of the motor, the blocks 16 are rotated to deliver the envelops singly from the chute 8 to the canceling stamp and as the envelops leave the chute they drop into position between the canceling stamp 24 and the coöperating roller 26 and the roller 25 and coöperating roller 26 and as the canceling stamp and the rollers 25 and 26 are revolving, the envelops are fed downwardly to the carrier 41 and in the passage of the envelops through the canceling stamp and the rollers 25 and 26 the stamps on the envelops are canceled. As the envelops drop into the carrier 41, the latter being driven from the shaft 37, moves the envelops in regular order outwardly along the chute 3 against the block 4, thereby keeping the envelops in order.

In the downward movement of the follower block 12 along the chute 8, the bridging strip 14 rides over the contact bars 11 and these bars are connected in circuit with the motor 34 and as soon as the block 12 reaches the limit of its downward movement the strip 14 disengages the bars 11, thereby breaking the circuit of the motor.

In Figs. 8, 9, 10 and 11 of the drawings, we have shown the detail construction of the canceling stamp and this stamp, in the present embodiment of our invention, embodies a drum 51 formed at diametrically opposite points with recesses and set into these recesses are plates 52 carrying type 53 arranged in rows in proper order to print any desired indicia on the envelops. Formed on the periphery of the drum 51 in alinement with the respective rows of type on the plate 52 are ribs 54 that receive ink from the inking roller to mar the stamps on the envelops. In this instance, the type carrying plates 52 are dovetailed into the recesses and are secured therein by means of levers 55 pivoted upon one end of the drum 51 and movable into engagement with the adjacent ends of the plates. In the rotation of the canceling stamp the ribs and type mark the envelop across the stamp end thereof, as shown in Fig. 13 of the drawings, owing to the envelop being fed to the canceling stamp with its longitudinal dimension in a horizontal plane.

In the present instance, the ratio of gearing between the shaft 16 and the shaft 22 is such that the blocks 17 on the shaft 16 make one complete revolution to every revolution of the shaft 22, thereby delivering two envelops to the canceling stamp in each revolution of such stamp, and as the stamp embodies two printing plates arranged at diametrically opposite points, stamps on both envelops will be canceled in the complete revolution of the shaft 22.

Figure 16:
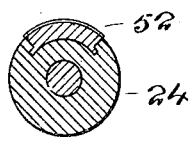
Fig. 16 is a cross sectional view showing a modified form of canceling stamp.

If desired, the canceling stamp may be equipped with but one type carrying plate, as illustrated in Figs. 14 and 16 of the drawings, and means may be employed to hold the envelop in position between the canceling stamp and the coöperating rollers 25 and 26 until the type carrying plate is in position to engage the envelop. In the present instance, this holding means comprises vertical arms 56 having the upper ends thereof pivoted to brackets 57 carried by the plate 5 adjacent to the lower edge thereof and spaced apart, and the lower ends formed with right angular lugs 58 and lying adjacent to the canceling stamp 24 and the roller 25 respectively. Interposed between the plate 5 and the arms 56 are expansion springs 59 acting to hold the lugs 58 normally out of the path of movement of the envelop. Fixed to the shaft 22 are cams 60 designed to engage the lower end portions of the arms 56 respectively to swing such arms against the action of the springs 59 to move the lugs 58 into the path of the envelops in their travel from the delivery means to the canceling stamp. In practice, the arms 56 are held normally in a position to hold the lugs 58 out of the path of movement of the envelops and when an envelop is delivered from the chute by the blocks 17 the cams 60 swing the arms 56 to move the lugs 58 into the path of movement of the envelops so as to hold the latter in position until the canceling stamp is about to engage the same. When the canceling stamp is in juxtaposition to the envelop the cams 60 release the arms 56 and the springs 59 react to restore the arms to normal position, thereby permitting the envelop to be passed between the canceling stamp and its coöperating rollers so that the stamp on such envelop may be canceled.

Figure 17:
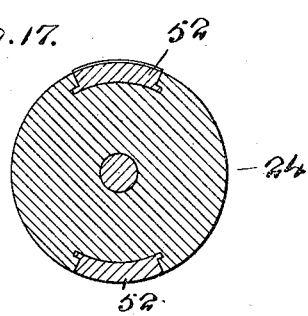
Fig. 17 is a similar view showing a further modification of the canceling stamp.
Figure 18:
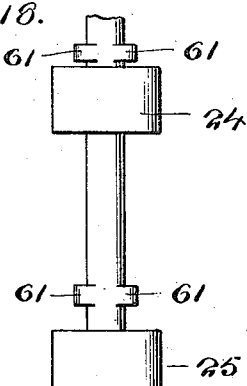
Fig. 18 is a view of a detail of the mechanism illustrated in Figs. 14 and 15.

The canceling stamp shown in Figs. 14 and 16 is equipped with only one type carrying plate and is relatively small in diameter. If desired, the canceling stamp may be increased in diameter and two type carrying plates secured thereto, as shown in Fig. 17 of the drawings, and when this type of canceling stamp is employed in connection with the holding means just described, the shaft 22 is equipped with diametrically opposed cams 61, as shown in Fig. 18, and these cams operate the arms 56 twice in each revolution of the shaft 22.

In Fig. 13 of the drawings, there is illustrated an envelop having its stamps canceled with the die shown in Fig. 10, this cancellation extending across the entire end of the envelop, having the printed matter centrally arranged, with the canceling lines $a$ arranged upon each side of the printed matter, so that the stamp will be canceled irrespective of its position to this end of the envelop. In Fig. 21 there is illustrated a fragmentary portion of the envelop with the stamps shown canceled thereon by the die shown in Fig. 20. In this form, the canceling lines $b$ are arranged at one side of the printed matter, these lines and the said printed matter occupying a portion of the upper right corner of the envelop.

Figure 19:
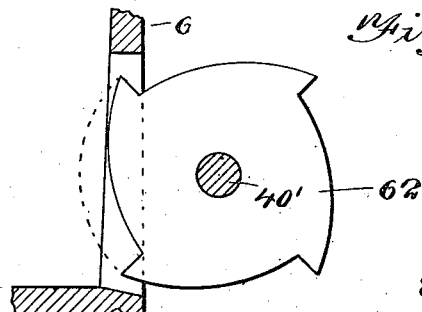
Fig. 19 is a detail view showing a modified form of the device for arranging the canceled envelops in a row.

In Fig. 19 of the drawings, we have shown a four pointed wheel 62 adapted to be used in lieu of the spiral carrier 41 and this wheel 62 is rotated upon a shaft 40' driven by suitable gearing from the shaft 40 and acts to feed the envelops along the chute 3 in the continued operation of the machine.

While we have herein shown and described certain preferred forms of our invention by way of illustration, we wish it to be understood that we do not limit or confine ourselves to the precise details of construction herein described and delineated, as modification and variation may be made within the scope of the claims and without departing from the spirit of the invention.

We claim:

1. In a stamp canceling machine, a chute adapted to hold the envelops in a row, a follower block therein, contact bars beneath said chute, and forming one terminal of an electric circuit and an electric terminal carried by said follower block and adapted to travel over said bars, said bars terminating short of the said chute, whereby, when the chute is emptied the circuit will be broken.

2. In an electrically operated stamp canceling machine, a chute, a follower block therein adapted to feed the envelops along said chute, an electric circuit, operating mechanism controlled by said circuit, a contact element carried by said block and forming one terminal of the electric circuit, spaced contact bars located in the path of travel of said element and adapted to be bridged thereby, said bars forming the other terminal of said circuit, and terminating short of the length of the chute, whereby, the circuit will be broken upon the follower block reaching the delivery end of the chute.

In testimony whereof we affix our signatures in presence of two witnesses.

ALBERT W. TUTTLE.
ROBERT C. CHILDS, Jr.

Witnesses:
JOSEPH P. FARLEY,
ORREL D. GARDNER.

Copies of this patent may be obtained for five cents each, by addressing the "Commissioner of Patents, Washington, D. C."